United States Patent [19]
Lynch

[11] 3,723,812
[45] Mar. 27, 1973

[54] AUXILIARY MEANS FOR COMPLETING CURRENT TRANSFORMER SECONDARY WINDING CIRCUIT

[75] Inventor: John C. Lynch, Canonsburg, Pa.

[73] Assignee: McGraw-Edison Company, Elgin, Ill.

[22] Filed: Mar. 18, 1971

[21] Appl. No.: 125,486

[52] U.S. Cl. .................... 317/14 A, 317/16, 317/31, 323/8
[51] Int. Cl. ............................................. H02h 7/04
[58] Field of Search .323/8; 317/31, 16, 14 A, DIG. 6

[56] References Cited

UNITED STATES PATENTS

| | | | |
|---|---|---|---|
| 2,991,396 | 7/1961 | Schurr | 317/DIG. 6 |
| 3,158,756 | 11/1964 | Brunner et al. | 323/8 |
| 3,221,234 | 11/1965 | Ault | 323/8 |

FOREIGN PATENTS OR APPLICATIONS

| | | | |
|---|---|---|---|
| 1,178,783 | 12/1958 | France | 317/14 A |
| 1,319,590 | 1/1963 | France | 323/8 |

OTHER PUBLICATIONS

Motorola, "Silicon Zener Diode And Rectifier Handbook", Second Edition, 9/64, pp. 80-81, TK 7872.S4 M66 1961 Rev.

Primary Examiner—James D. Trammell
Attorney—Richard C. Ruppin

[57] ABSTRACT

A semi-conductor switch means is provided which is connected to a current transformer secondary winding and is responsive in conduction to the voltage across the secondary winding rising to a predetermined level upon the removal of the load on the secondary winding and its open circuiting. The secondary winding itself is part of the circuit and the impedance of the winding limits the current flow through the switch means.

8 Claims, 1 Drawing Figure

Patented March 27, 1973  3,723,812
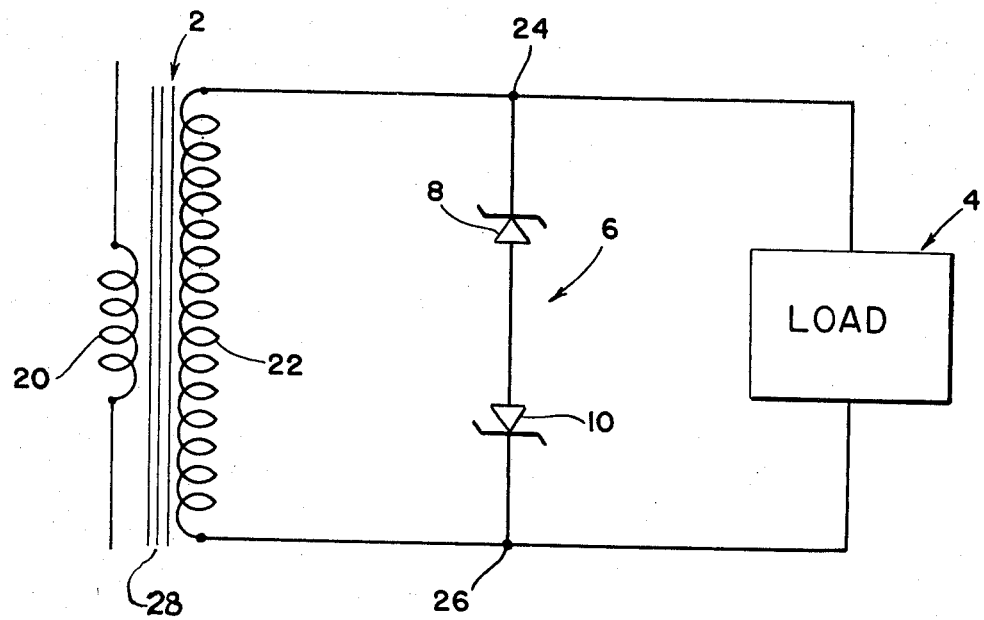

AUXILIARY MEANS FOR COMPLETING CURRENT TRANSFORMER SECONDARY WINDING CIRCUIT

BACKGROUND OF THE INVENTION

This invention relates to means for completing a conducting circuit across a current transformer secondary winding when the load circuit connected to the secondary winding is disconnected.

Current transformers are used to couple alternating current power circuits and metering or control circuits while at the same time isolating the metering and control circuits from the high current and voltage levels of the power circuits. The primary winding of the current transformer is connected in series with a line of the power circuit and usually consists of a few or only one turn. The secondary winding of the transformer usually has a number of turns and is magnetically coupled to the primary winding by means of a steel core.

A basic energy relationship of the primary and secondary windings of the current transformer is that the volt-amperes of the secondary winding must at all times equal the volt-amperes of the primary winding. Since the primary winding is serially connected to the power line, it is always energized while the power line is carrying current without regard to the circuit condition of the secondary winding. Thus, if the load on the secondary winding is disconnected and the secondary winding is open circuited, there will be no current flowing through it and therefore the voltage across the secondary winding will attempt to go to infinity in order to satisfy the volt-ampere requirement. This voltage level is limited only by the saturation of the core, however, it is well above the safe insulation level of the current transformer and quite hazardous to personnel who may be working with the transformer.

Another basic relationship of the current transformer windings is that the voltage across the secondary winding is determined by the electromotive force induced in the secondary winding by the flux generated by the primary winding and the counter-electromotive force generated in the secondary winding by the current flowing through it. The counter-electromotive force acts in opposition to the electromotive force to hold the voltage across the secondary winding at a lower level.

Several devices have been employed in the past to maintain current flow and accompanying counter-electromotive force in the secondary winding at the time the load is removed from the secondary winding and the latter is open circuited. These devices provide an auxiliary current flow path at the time the load is removed and consist of means for manually short circuiting the current transformer secondary by an operator or a permanent auxiliary circuit across the current transformer secondary. The manual device depends on the operator's presence of mind or special short circuiting switches if the auxiliary circuit is inserted automatically. A permanently connected auxiliary circuit utilizes power at all times and therefore upsets the accuracy of any associated instrumentation.

SUMMARY OF INVENTION

It is a general object of the invention to provide a simple and economical auxiliary circuit permanently connected to the secondary winding of a current transformer and which conducts only if the voltage across the current transformer secondary winding exceeds an allowable level and which is limited in its current conducting level by the impedance of the secondary winding.

The objects of the invention are accomplished by providing a switch means connected to a current transformer secondary winding which is responsive in conduction to the voltage across the secondary winding rising to a predetermined level upon the removal of the load on the secondary winding and its open circuiting. The secondary winding itself is part of the circuit and the impedance of the winding serves to limit the current flow through the switch means.

BRIEF DESCRIPTION OF THE DRAWING

The FIGURE shows a preferred embodiment of the invention.

DESCRIPTION OF THE PREFERRED EMBODIMENT

With reference to the FIGURE, a current transformer 2 is shown as having a primary winding 20, a secondary winding 22 and secondary winding terminals 24 and 26. The current transformer 2 also includes a magnetic core designated by the numeral 28. A load circuit 4 and a switch circuit 6 are both connected to the secondary winding 22 at terminals 24 and 26. The load circuit 4 is typically a relay or instrumentation type load. In the embodiment shown in the FIGURE, the switch circuit 6 comprises Zener diodes 8 and 10 connected back-to-back.

The primary winding 20 of current transformer 2 is connected in series with an alternating current power line (not shown) and, by means of the magnetic coupling through core 28 induces an electromotive force and current in the secondary winding 22. The current flowing in secondary winding 22 generates a counter-electromotive force in opposition to the electromotive force induced by the energy from the primary winding 20. Thus, the voltage across secondary winding 22 and appearing between terminals 24 and 26 is determined by the difference between the electromotive force and counter-electromotive force.

As previously stated, the volt-amperes of the secondary winding 22 of the current transformer 2 equals the volt-amperes of the primary winding 20 of the current transformer 2. If the impedance of the circuit including the secondary winding 22 and the load circuit 4 in the FIGURE varies while the volt-amperes of the primary winding 20 remains constant, the voltage and amperage of the secondary winding 22 will also vary to maintain the constant volt-ampere relationship. Thus, if the impedance of the circuit including secondary winding 22 increases, the current will decrease but the voltage will increase to maintain constant volt-amperes. However, and disregarding momentarily the switch circuit 6, if the load circuit 4 is disconnected from the terminals 24 and 26 to open circuit the secondary winding 22, the flow of all current will cease and the voltage across the secondary winding 22 will rise from a low level which it had while the load circuit 4 was connected to an extremely high level which is limited only by the saturation of the magnetic core 28. This high voltage level is well above the safe insulation level of current transformer 2.

The Zener diode semi-conductors 8 and 10 shown are conductive in a reverse direction from their cathode to their anode in response to a distinct voltage level applied across their cathode-anode circuits. Once the Zener diodes 8 and 10 become conductive in a reverse direction they will maintain a constant voltage drop across their terminals for all values of current within their capacity providing the available voltage is not less than the minimum required for conduction. Also, the impedance of a Zener diode after it becomes conductive is relatively small and varies inversely with the current conducted. Thus, where it is desired to limit the current flow through a Zener diode to prevent current in excess of its rating, an impedance is placed in series with the Zener. Such impedance also serves another purpose in combination with a Zener diode such as in voltage regulating circuits where the impedance is used to drop the varying amount of an unregulated voltage in excess of the constant fixed voltage drop across the Zener.

Considering now the operation of the circuit shown in the FIGURE including the switch circuit 6. The Zener diodes 8 and 10 may be selected to have a break down voltage level above the normal operating low voltage level when the load circuit 4 is connected across the secondary winding 22 and below the high voltage level which occurs when the secondary winding 22 is open circuited. Thus, when the load circuit 4 is disconnected from the terminals 24 and 26, the Zener diodes 8 and 10 will alternately break down and conduct in response to the alternating voltage rising toward the high level. When the Zener diodes 8 and 10 conduct, they will maintain a voltage drop across terminals 24 and 26 at their constant rated value. The current flowing through the Zener diodes 8 and 10 and through the secondary winding 22 generates a counter electromotive force in the winding 22 which opposes the electromotive force induced by the primary winding 20 so that the voltage across the winding 22 is held at the constant voltage drop of the Zener diodes 8 and 10.

Moreover, the current flow through the Zener diodes 8 and 10 is limited by the impedance of the secondary winding 22 when the diodes are conductive. The basic relationship determining current flow is that the current is equal to the voltage across secondary winding 22 divided by the impedance of the circuit including winding 22 and the Zener diodes 8 and 10. The diodes 8 and 10 however, have an impedance when conducting that is very small and insufficient to limit current flowing through them to a level within their limited capacity. Thus, the current flowing in the circuit is limited primarily by the impedance of winding 22. Where the voltage level across secondary winding 22 is higher than its normal operating level while connected to load circuit 4, current flowing will be at a lower level in order to satisfy the constant voltage-ampere requirement previously discussed. Thus, the quotient of the voltage and current results in an impedance in the secondary winding 22 of a magnitude higher than during normal load conditions and substantially greater than the magnitude of the impedance of the Zener diodes 8 and 10.

It can thus be seen that a simple and economical auxiliary circuit for flow of current through the secondary winding of a current transformer has been provided which will operate automatically when the secondary load is removed and does not impose an interfering burden on the secondary of the current transformer during operation of the load circuit. Moreover, the switch means of the auxiliary circuit utilizes a semi-conductor having a low impedance and the impedance of the current transformer secondary winding is utilized in the auxiliary circuit to limit current flow through it.

While only a single embodiment of the invention has been shown herein, it will be realized many modifications thereof are feasible without departing from the spirit and scope of the invention. It is accordingly intended that the scope of the invention is not to be limited to the embodiment disclosed.

I claim:

1. In combination with a current transformer having an energized primary winding and a secondary winding having a voltage across its terminals and being connected to a load, said secondary winding being disconnectable from said load, circuit means providing a flow path for current flowing through the secondary winding other than through the load comprising: the secondary winding of the current transformer, said secondary winding having a high voltage level when disconnected from the load, and a semi-conductor switch circuit connected alone in series with the secondary winding when the latter is disconnected from the load and being nonconductive while said load is connected to the secondary winding, said semi-conductor switch circuit being conductive in response to said voltage rising toward said high voltage level to conduct current from the secondary winding, said semi-conductor switch circuit having a distinct voltage level thereacross while conducting current, said current having a level determined by the impedance of the secondary winding in series with the switch whereby the product of the voltage and current respectively determined by the semi-conductor switch circuit and the impedance of the secondary winding does not become excessive when the load is disconnected from the secondary winding.

2. The combination according to claim 1 wherein said semi-conductor switch circuit includes a Zener diode.

3. The combination according to claim 1 wherein the impedance of said semi-conductor decreases with increased current flow through it and the impedance of the secondary winding increases to said value as the impedance of the semi-conductor decreases.

4. In combination with a current transformer having an energized primary winding, a voltage regulator circuit comprising: a secondary winding of the current transformer, and semi-conductor switch means connected in circuit with said secondary winding for maintaining the voltage across said secondary winding within a predetermined range, said semi-conductor switch means being conductive only in response to a voltage across its terminals not less than a predetermined distinct level and being in circuit alone with said secondary winding while so conductive, said semi-conductor switch means having an impedance during conduction insufficient to limit current through it to a safe operating level, said secondary winding having an impedance during conduction of said semi-conductor switch means sufficient to limit current through the switch means to a safe level, condition, circuit means providing a flow path for current flowing through the secondary winding other than through the load comprising: the secondary winding of the current transformer, said secondary winding having a high voltage level when said load is in its high impedance condition, and semi-conductor switch means having a constant voltage drop across its terminals while conductive and being connected in circuit with said secondary winding for maintaining the voltage across said secondary winding at a distinct lower level than said high voltage level, said semi-conductor switch means being conductive in response to said voltage rising toward said high voltage level to conduct said current from the secondary winding, said semi-conductor switch means having an impedance during conduction of said switch means insufficient to limit current through it to a safe level, said secondary winding having an impedance during conduction of said switch means sufficient to limit current through the switch means to a safe level.

5. The combination according to claim 4 wherein said switch means comprises a semi-conductor switch circuit having an impedance varying inversely with the level of current flowing through it.

6. The combination according to claim 5 wherein said semi-conductor switch circuit includes a Zener diode.

7. In combination with a current transformer having an energized primary winding, a secondary winding having a voltage across its terminals and a load connected across said terminals and having a high impedance.

8. The combination according to claim 7 wherein said load has an intermediate impedance condition less than said high impedance condition and the secondary winding has said high voltage level when the load is in its intermediate impedance condition.

* * * * *

PC-1050
(5/69)

UNITED STATES PATENT OFFICE
CERTIFICATE OF CORRECTION

Patent No. 3,723,812          Dated March 27, 1973

Inventor(s) John C. Lynch

It is certified that error appears in the above-identified patent and that said Letters Patent are hereby corrected as shown below:

Column 4, line 66, following "level" cancel ",condition, circuit means" and substitute -.-; Column 4, line 67, cancel. Column 5, cancel. Column 6, line 12, before the "." insert -condition, circuit means providing a flow path for current flowing through the secondary winding other than through the load comprising: the secondary winding of the current transformer, said secondary winding having a high voltage level when said load is in its high impedance condition, and semi-conductor switch means having a constant voltage drop across its terminals while conductive and being connected in circuit with said secondary winding for maintaining the voltage across said secondary winding at a distinct lower level than said high voltage level, said semi-conductor switch means being conductive in response to said voltage rising toward said high voltage level to conduct said current from the secondary winding, said semi-conductor switch means having an impedance during conduction of said switch means insufficient to limit current through it to a safe level, said secondary winding having an impedance during conduction of said switch means sufficient to limit current through the switch means to a safe level.-

Signed and sealed this 22nd day of January 1974.

(SEAL)
Attest:

EDWARD M. FLETCHER, JR.        RENE D. TEGTMEYER
Attesting Officer               Acting Commissioner of Patents